Patented Sept. 22, 1936

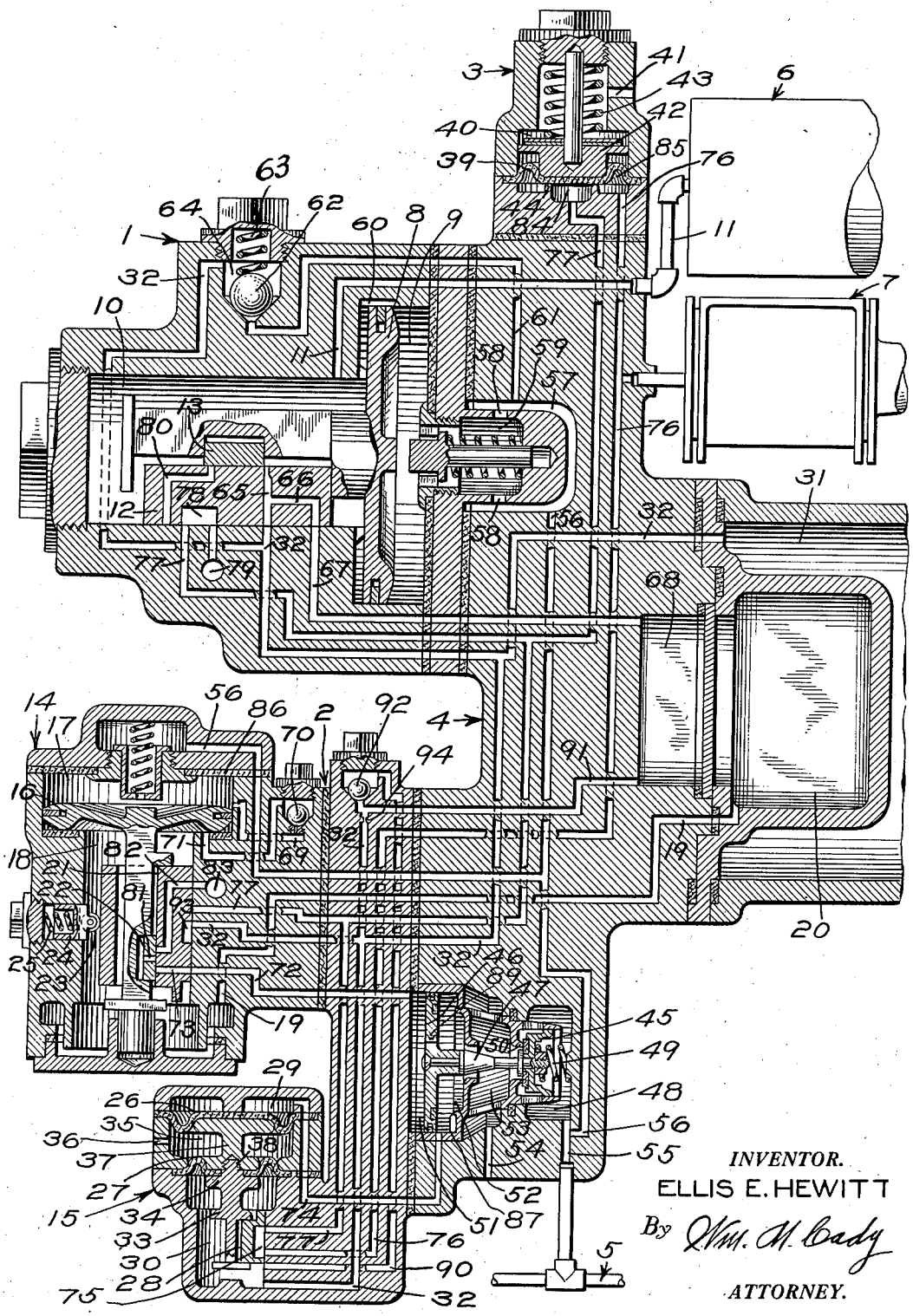

2,055,102

UNITED STATES PATENT OFFICE 2,055,102

FLUID PRESSURE BRAKE

Ellis E. Hewitt, Edgewood, Pa., assignor to The Westinghouse Air Brake Company, Wilmerding, Pa., a corporation of Pennsylvania Application January 27, 1932, Serial No. 589,112
Renewed February 15, 1936

15 Claims. (Cl. 303—46)

This invention relates to fluid pressure brakes, and more particularly to the type adapted to operate upon a reduction in pressure in the brake pipe to effect an application of the brakes and upon an increase in brake pipe pressure to effect a release of the brakes.

With the present tendency to increase the number of cars in a train, the difficulty of controlling the brakes, so as not to produce excessive shocks, is correspondingly increased.

Such shocks are liable to be produced because the brakes at the front of the train are applied before the brakes at the rear of the train are applied, so that the slack in the train tends to run in toward the front of the train and produce shocks. Excessive shocks tend to be produced more when an emergency application of the brakes is effected than when a service application of the brakes is effected, because in effecting an emergency application of the brakes, the rate of application generally exceeds the rate employed in effecting a service application of the brakes.

The principal object of my invention is to provide an improved fluid pressure brake equipment, which will operate upon a sudden reduction in brake pipe pressure in effecting an emergency application of the brakes to so regulate the supply of fluid under pressure to the brake cylinder that severe shocks will be prevented.

According to my invention, the improved fluid pressure brake equipment is adapted to operate upon an emergency reduction in brake pipe pressure to first supply fluid under pressure to the brake cylinder from a relatively small inshot reservoir, in order to insure the movement of the brake cylinder piston out past the usual leakage groove and so as to cause the brake shoes to engage the car wheels. Following the initial inshot, the brake cylinder pressure is gradually built up through a restricted port to a predetermined degree, this gradual build-up being adapted to cause the slack in the train to gently gather, after which, fluid under pressure is supplied to the brake cylinder at a more rapid rate for stopping the train. When a service application of the brakes is effected, the rate of supply of fluid to the brake cylinder is not varied as in effecting an emergency application of the brakes, but instead is at a rate corresponding to the gradual service reduction in brake pipe pressure.

Other objects and advantages will appear in the following more detailed description of my invention.

In the accompanying drawing, the single figure is a diagrammatic, sectional view of a fluid pressure brake equipment embodying my invention.

As shown in the drawing, the fluid pressure brake equipment comprises a triple valve device 1, an emergency valve portion 2, and a delay valve device 3 preferably mounted on a pipe bracket 4 to which is connected a brake pipe 5, an auxiliary reservoir 6 and a brake cylinder 7.

The triple valve device 1 comprises a piston 8, having at one side a chamber 9 connected to the brake pipe 5 and at the other side a valve chamber 10 connected to the auxiliary reservoir 6, through a passage and pipe 11, and containing a main slide valve 12 and an auxiliary slide valve 13 adapted to be operated by said piston.

The emergency valve portion 2 comprises an emergency valve device 14 and a control valve device 15 contained in a filler block interposed between the emergency valve device 14 and the pipe bracket 4.

The emergency valve device 14 comprises a piston 16, having at one side a chamber 17 connected to the brake pipe 5 and at the other side a valve chamber 18 connected by means of a passage 19 to a quick action reservoir 20. Contained in valve chamber 18 is a main slide valve 21 and an auxiliary slide valve 22 adapted to be operated by the piston 16. Means are provided for pressing the main slide valve 21 to its seat, said means comprising a roller 23 engaging said slide valve and carried by a movable plunger 24 which at all times is acted upon by a spring 25.

The control valve device 15 comprises a pair of spaced, flexible diaphragms 26 and 27 and a slide valve 28, adapted to be operated by said diaphragms. The diaphragm 26 is of greater area than diaphragm 27 and has at one side a chamber 29, while the diaphragm 27 has at one side a chamber 30, containing the slide valve 28 and communicating at all times with an emergency reservoir 31 through a passage 32. A stem 33 is provided in chamber 30 for operating the slide valve 28, said stem having an enlarged head portion 34 engaging the diaphragm 27. A chamber 35 is provided between the diaphragms 26 and 27 and is open to the atmosphere through a passage 36, said chamber containing a spool-like member 37 secured to a stud 38 projecting from the stem head 34 through the diaphragm 27. One end of the member 37 engages the diaphragm 26 for transmitting deflection of said diaphragm to the stem 33.

The delay valve device 3 comprises a flexible diaphragm 39 having at one side a chamber 40 open to the atmosphere through a passage 41 and containing a plunger 42 engaging said diaphragm and a spring 43 acting on said plunger for urging said diaphragm into engagement with a seat rib 44 formed in the pipe bracket.

Preferably disposed in the pipe bracket 4 is a vent valve mechanism comprising a vent valve 45 and a piston 46 connected to said vent valve by means of a stem 47, said piston being adapted to unseat said vent valve. The vent valve is contained in a chamber 48 connected to the brake pipe 5 and a spring 49 is provided in said chamber for urging said vent valve into engagement with a seat rib 50. The piston 46 has a one side a chamber 51 and at the other side a chamber 52 which is at all times open to the atmosphere through a chamber 53 and an atmospheric passage 54.

In operation, when the brake pipe 5 is charged with fluid under pressure in the usual manner, fluid flows from the brake pipe 5 through passage 55 to the vent valve chamber 48 and from passage 55 through passage 56 to the emergency piston chamber 17 and to a chamber 57. From chamber 57 fluid flows through ports 58 to a chamber 59 and from thence to the triple valve piston chamber 9.

If the triple valve piston 8 is in release position, as shown in the drawing, fluid flows from chamber 9 through a feed groove 60 to valve chamber 10 and from thence through passage and pipe 11 to the auxiliary reservoir 6.

Fluid also flows from the brake pipe passage 56 through chamber 57 and passage 61 to the seat of a check valve 62 and raises said check valve against the opposing pressure of a light spring 63. Fluid then flows past said check valve to chamber 64 and from thence through passage 32 to the emergency reservoir 31 and to the control valve chamber 30. The passage 32 leads to the seat of the triple valve slide valve 12, which is provided with a port 65 adapted to register with passage 32 when the triple valve device is in release position. Port 65 is normally uncovered by the auxiliary slide valve 13, so that the pressures in valve chamber 10, the auxiliary reservoir 6, the emergency reservoir 31 and control valve chamber 30 are permitted to equalize and build up to the pressure of fluid carried in the brake pipe 5.

Port 65 in the triple valve slide valve 12 is provided with a branch port 66, which, when the triple valve device is in release position, registers with a passage 67 communicating with an inshot reservoir 68, so that fluid under pressure is supplied to said reservoir and said reservoir is charged up to brake pipe pressure.

If the emergency valve device is in release position, as shown in the drawing, fluid under pressure supplied from the brake pipe 5 to piston chamber 17, flows from said chamber through a restricted passage 69, past a check valve 70 and through a passage 71 to the emergency valve chamber 18 and from thence through passage 19 to the quick action reservoir 20, thus charging said chamber and reservoir up to brake pipe pressure.

Assuming the vent valve piston 46 to be in its normal position, as shown in the drawing, diaphragm chamber 29 of the control valve device 15 is vented to the atmosphere through passage 74, chamber 52 at one side of the vent valve piston, chamber 53 and through the atmospheric passage 54. This permits emergency reservoir pressure acting in valve chamber 30 on diaphragm 27 to maintain the control valve device 15 in its normal position, as shown in the drawing.

With the control valve device in its normal position, a cavity 75 in the slide valve 28 connects a passage 76 from the brake cylinder 7 to a passage 77 leading to the seat of the emergency slide valve 21 and to the seat of the triple valve slide valve 12. Passage 77 is normally lapped by the emergency slide valve 21, but with the triple valve device in release position, passage 77 is connected to the atmosphere through a cavity 78 and atmospheric passage 79, so that the brake cylinder 7 is vented.

When the brake pipe pressure is gradually reduced to effect a service application of the brakes, the triple valve piston 8 is moved outwardly, first actuating slide valve 13 to uncover a service port 80 in the main slide valve 12, and then moving the main slide valve until the service port 80 registers with passage 77. Fluid under pressure then flows from the valve chamber 10 and connected auxiliary reservoir 6 through port 80 to passage 77 and from thence through cavity 75 in the control valve slide valve 28 and passage and pipe 76 to the brake cylinder 7, thereby effecting an application of the brakes.

When a gradual reduction in brake pipe pressure is effected, the emergency piston 16 is moved outwardly, thereby moving the auxiliary slide valve 22 relative to the main slide valve 21, until port 81 in the auxiliary slide valve registers with port 82 in the main valve. Port 82 normally registers with an atmospheric passage 83, so that fluid under pressure is thus permitted to flow from the valve chamber 18 and connected quick action chamber 29 to the atmosphere at the same rate as the brake pipe pressure is gradually reduced in piston chamber 17. As a result, the movement of the emergency piston 16 and auxiliary slide valve ceases in this venting position upon a gradual reduction in brake pipe pressure and when the pressure in valve chamber 18 is reduced to a degree slightly less than the brake pipe pressure in chamber 17, the emergency piston operates to return the auxiliary slide valve to its normal position shown in the drawing.

The operation of the quick action mechanism and control valve device 15 depends upon movement of the emergency valve device to emergency position as will hereinafter be fully described, but in effecting a service application of the brakes said mechanism and control valve device do not operate and as a result, the supply of fluid under pressure to the brake cylinder through cavity 75 in the control valve slide valve 28 is not interrupted by said valve, but instead, is entirely controlled by operation of the triple valve device 1, as hereinbefore described.

Fluid at the pressure supplied by the triple valve device to passage 77 acts in chamber 84 on the delay valve diaphragm 39 within the seat rib 44, while fluid at the pressure in the brake cylinder passage 76 acts in chamber 85 outside of the seat rib 44. When the pressures in chambers 84 and 85 are increased upon a build-up of brake cylinder pressure to a degree sufficient to overcome the opposing pressure of spring 43, diaphragm 39 is deflected away from seat rib 44 thereby connecting passages 77 and 76. The connecting of these two passages in effecting a service application of the brakes has no effect since said passages are connected through the control valve slide valve 28, but in effecting an emergency application of the brakes the connecting of said passages through the delay valve device is adapted to increase the rate at which fluid under pressure is supplied to brake cylinder 7, as will be hereinafter described.

If it is desired to effect a release of the brakes after a service application, the brake pipe pressure is increased in the usual manner. The resulting increase in pressure in the triple valve piston chamber 9 shifts the triple valve piston 8 and slide valves 12 and 13 to release position, in which fluid under pressure is vented from the brake cylinder 7 through passage 76, cavity 75 in the control valve slide valve 28, passage 77, cavity 78 in the triple valve slide valve 12 and atmospheric passage 79, thereby releasing the brakes.

With the triple valve device in release position, fluid at brake pipe pressure is supplied from piston chamber 9 through the feed groove 60 to valve chamber 10 and from thence through passage 11 to the auxiliary reservoir 6.

At the same time as fluid under pressure is supplied from the brake pipe to the auxiliary reservoir, fluid under pressure also flows back from the emergency reservoir 31 to the auxiliary reservoir 6 by way of passage 32 and port 65 in the main slide valve 12, said port being open to valve chamber 10. The supply of fluid from the emergency reservoir to the auxiliary reservoir augments the charging of the auxiliary reservoir up to equalization of the pressures in said reservoirs, after which said reservoirs both charge to the pressure carried in the brake pipe in the same manner as in initially charging the brake equipment.

As the brake pipe pressure acting in the emergency piston chamber 17 is increased, fluid flows from said chamber through passage 69, past check valve 70 and through passage 71 to valve chamber 18 and from thence through passage 19 to the quick action reservoir 20, thus fully recharging said reservoir to the pressure carried in the brake pipe.

Upon the venting of fluid under pressure from the brake cylinder, fluid under pressure is released from chambers 84 and 85 at one side of the delay valve diaphragm 39, so as to permit spring 43 to return said diaphragm into sealing engagement with seat rib 44, so that the delay valve device 3 may be operative in effecting an emergency application of the brakes.

When a sudden reduction in brake pipe pressure is initiated to effect an emergency application of the brakes, the sudden reduction in pressure in piston chamber 9 of the triple valve device causes the triple valve piston 8 to move outwardly and actuate the slide valves 12 and 13 so as to connect the service port 80 with passage 77 for permitting fluid from the auxiliary reservoir 6 to flow to passage 77 in the same manner as in effecting a service application of the brakes.

The sudden reduction in brake pipe pressure in emergency piston chamber 17 permits quick action reservoir pressure to move the piston 16 and slide valves 21 and 22 outwardly. The capacity of port 81 in the auxiliary slide valve 22 to vent fluid from valve chamber 18 to passage 82 and thence to the atmosphere being insufficient to reduce the pressure in valve chamber 18 at a rate equal to the sudden reduction in piston chamber 17, the piston 16 and auxiliary slide valve 22 do not stop in the position assumed in effecting a service application of the brakes, but instead, the outward movement is continued until port 73 through the main valve 21 is opened to valve chamber 18. This permits fluid under pressure to flow from the valve chamber 18 and quick action reservoir 20 through port 73 to passage 72 leading to the vent valve piston chamber 51.

The supply of fluid to the vent valve piston chamber 51 by way of port 73 may be only in the form of a sudden inshot due to the further and immediate movement of the emergency valve parts to emergency position, in which piston 16 engages the gasket 86 and passage 72 is opened directly to the valve chamber 18 past the end of the main slide valve 21. If the main slide valve does not promptly move to full emergency position, fluid continues to be supplied through port 73 and passage 72 to the vent valve piston chamber so as to positively ensure prompt operation of the vent valve mechanism.

Fluid supplied to the vent valve piston chamber 51 moves the piston 46 inwardly and unseats the vent valve 45. The unseating of the vent valve 45 establishes a direct communication from brake pipe 5 to the atmosphere by way of passage 55, vent valve chamber 48, chamber 53 and atmospheric passage 54, and through said communication, fluid under pressure is suddenly vented from the brake pipe 5 for rapidly propagating quick action serially through the train.

The movement of piston 46 to unseat the vent valve 45 disconnects passage 74, leading to diaphragm chamber 29 of the control valve device, from the vented chamber 52 and connects said passage to chamber 51. The piston 46 is provided with a restricted port 89 for controlling the venting of fluid from chamber 51 to chamber 52 and from thence to chamber 53 and to the atmosphere through passage 54. Due to this restricted port, fluid under pressure flows from chamber 51 through passage 74 to diaphragm chamber 29 of the control valve device and in order to prevent leakage past the vent valve piston 46 from increasing the rate at which fluid under pressure is vented from chamber 51, a seal is effected between the vent valve piston 46 and the casing on a seat rib 87.

Fluid under pressure supplied to chamber 29 of the control valve device and acting on the large diaphragm 26 overcomes emergency reservoir pressure acting in chamber 30 on the smaller diaphragm 27 and deflects said diaphragms downwardly, thereby moving the slide valve 28 to a position in which cavity 75 connects the brake cylinder passage 76 to a passage 90.

The outward movement of the triple valve device laps passage 67 leading to the inshot reservoir 68 and when the control valve device is operated as just described, fluid under pressure is vented from the inshot reservoir 68 through a passage 91, past a check valve 92, through passage 90, cavity 75 in the control valve slide valve and passage 76 to the brake cylinder 7. This sudden inshot of fluid to the brake cylinder is limited to equalization of the pressures in the inshot reservoir and brake cylinder and provides a brake cylinder pressure of sufficient degree to promptly move the piston in the brake cylinder 7 out past the usual leakage groove to the brake applying position.

At the same time as the sudden inshot of fluid to the brake cylinder is effected, fluid under pressure is also supplied to the brake cylinder from the auxiliary reservoir 6 and emergency reservoir 31 at a restricted rate in the following manner.

Fluid under pressure is supplied to passage 77 from the auxiliary reservoir 6 through the triple valve device as hereinbefore described. With the emergency valve device in emergency position, a cavity 93 in the slide valve 21 connects passage 77 to the emergency reservoir passage 32, so that fluid under pressure is permitted to flow from the auxiliary reservoir 6 and emergency reservoir 31 through passage 32, a choke 94 to passage 91 from the inshot reservoir 68 and from thence to the brake cylinder.

Thus initially, a sudden inshot of fluid to the brake cylinder is obtained at the same time as fluid is supplied to the brake cylinder from the auxiliary reservoir 6 and emergency reservoir 31, but after the initial inshot, fluid continues to flow from said reservoirs to the brake cylinder at a slow rate, the purpose of which is to cause a gathering of the train slack without severe shock.

The pressure of fluid in the auxiliary and emergency reservoirs as supplied through passage 77 to chamber 84, acts on the delay valve diaphragm 39 while brake cylinder pressure acts in chamber 85 on said diaphragm and when the brake cylinder pressure in chamber 85 is increased sufficiently, the pressure of spring 43 is overcome and diaphragm 39 is deflected away from seat rib 44, so as to connect passage 77 directly to brake cylinder passage 76. Since passage 77 is supplied with fluid from the auxiliary reservoir 6 and is connected to the emergency reservoir passage 32 through the emergency valve device, fluid is thus permitted to flow from both of said reservoirs through passagge 77 to passage 76 and to the brake cylinder at a faster rate than that permitted through choke 94 by itself, it being understood, of course, that fluid may continue to flow to the brake cylinder through said choke after the operation of the delay valve device, although such flow is not important.

While the brakes are being applied as above described, quick action chamber pressure continues to reduce through port 89 in the vent valve piston and when reduced to a predetermined degree, emergency reservoir pressure in chamber 30 of the control device acting on the smaller diaphragm 27 overcomes the reduced pressure in chamber 29 acting on diaphragm 26 and deflects said diaphragms upwardly to their normal positions, returning the slide valve 28 to its normal position. When the pressure in the vent valve piston chamber 51 is sufficiently reduced, spring 49 seats the vent valve 45 and moves the vent valve piston out of engagement with seat rib 87. With the vent valve thus seated, the brake pipe may be charged to effect a release of the brakes when desired.

It will be noted that, when the control valve device 15 is moved to its normal position, passages 77 and 76 are connected through cavity 75 in the same manner as said passages are connected by operation of the delay valve device, so that, if for any reason the delay valve device fails to operate, the final supply of fluid under pressure from the auxiliary reservoir and emergency reservoir to the brake cylinder will be effected through the control valve device.

To effect a release of the brakes after an emergency application, fluid under pressure is supplied to the brake pipe in the usual manner and from thence to the triple valve piston chamber 9 and emergency valve piston chamber 17. The triple valve device is thereupon operated to vent fluid under pressure from the brake cylinder and to supply fluid under pressure to the auxiliary reservoir 6, the emergency reservoir 31 and inshot reservoir 68, and the emergency valve device is operated to charge the quick action chamber 20 in the same manner as hereinbefore described.

It will now be noted that, in accordance with my improvement, fluid under pressure is supplied to the brake cylinder at a predetermined rate in effecting a service application of the brakes, but in effecting an emergency application of the brakes, the supply of fluid to the brake cylinder is at three different rates in order to ensure proper gathering of the train slack ahead of applying the brakes on the train with sufficient force to stop the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, an auxiliary reservoir, and two other reservoirs, of a triple valve device operative upon a reduction in brake pipe pressure to establish a communication through which fluid under pressure is supplied from said auxiliary reservoir to said brake cylinder, and valve means for controlling said communication and operative upon a sudden reduction in brake pipe pressure to close said communication and to establish another communication through which fluid under pressure is supplied from one of said other reservoirs to said brake cylinder at a certain rate and from said auxiliary reservoir and the other of said other reservoirs at a different rate.

2. In a fluid pressure brake, the combination with a brake pipe, a brake cylinder, an auxiliary reservoir, an emergency reservoir and an inshot reservoir, of valve means operative upon a sudden reduction in brake pipe pressure to establish a communication through which fluid under pressure is supplied from said inshot reservoir to said brake cylinder at a certain rate and from said auxiliary reservoir and emergency reservoir to said brake cylinder at a different rate, and a triple valve device operative upon a reduction in brake pipe pressure to establish the communication through which fluid under pressure is supplied from the auxiliary reservoir to said valve means.

3. In a fluid pressure brake, the combination with a brake pipe, a brake cylinder, an auxiliary reservoir, an emergency reservoir and an inshot reservoir, of valve means operative upon a sudden reduction in brake pipe pressure to establish a communication through which fluid under pressure is supplied from said inshot reservoir to said brake cylinder at a certain rate and from said auxiliary reservoir and emergency reservoir to said brake cylinder at a different rate, means controlled by brake cylinder pressure for changing the rate at which fluid under pressure is supplied from said auxiliary reservoir and emergency reservoir to said brake cylinder, and a triple valve device operative upon a reduction in brake pipe pressure to establish the communication through which fluid under pressure is supplied from the auxiliary reservoir to said valve means.

4. In a fluid pressure brake, the combination with a brake pipe, a brake cylinder, an inshot reservoir and another reservoir, of valve means operative to establish a communication through which fluid is supplied from said inshot reservoir to said brake cylinder at a certain rate and from said other reservoir to said brake cylinder at a different rate, and a valve device controlled by brake pipe pressure for governing the operation of said valve means.

5. In a fluid pressure brake, the combination with a brake pipe, a brake cylinder, an inshot reservoir and another reservoir, of valve means operative to establish a communication through which fluid is supplied from said inshot reservoir to said brake cylinder at a certain rate and from said other reservoir to said brake cylinder at a different rate, a chamber normally charged with fluid under pressure, and a valve device operative upon a reduction in brake pipe pressure to vent fluid under pressure from said chamber for effecting the operation of said valve means.

6. In a fluid pressure brake, the combination with a brake pipe, a brake cylinder, an inshot reservoir and another reservoir, of valve means operative to establish a communication through which fluid is supplied from said inshot reservoir to said brake cylinder at a certain rate and from said other reservoir to said brake cylinder at a different rate, mechanism for venting fluid under pressure from said brake pipe, a chamber normally charged with fluid under pressure and a valve device operative upon a reduction in brake pipe pressure to vent fluid under pressure from said chamber for effecting the operation of said mechanism and said valve means.

7. In a fluid pressure brake, the combination with a brake pipe, a brake cylinder, an inshot reservoir and another reservoir, of valve means operative to establish a communication through which fluid is supplied from said inshot reservoir to said brake cylinder at a certain rate and from said other reservoir to said brake cylinder at a different rate, a chamber normally charged with fluid under pressure, a valve device operative upon a reduction in brake pipe pressure to vent fluid under pressure from said chamber for effecting the operation of said valve means, and mechanism for controlling the supply of fluid from said chamber to said valve means and operative by fluid vented from said chamber for venting fluid under pressure from said brake pipe.

8. In a fluid pressure brake, the combination with a brake pipe, a brake cylinder, an auxiliary reservoir, an emergency reservoir and an inshot reservoir, of a triple valve device operative upon a reduction in brake pipe pressure to establish a communication through which fluid under pressure is supplied from said auxiliary reservoir to said brake cylinder, valve means subject to the pressure of fluid in said emergency reservoir for controlling said communication and operative to close said communication and establish another communication through which fluid under pressure is supplied from said inshot reservoir to said brake cylinder at a certain rate and from said auxiliary reservoir and emergency reservoir to said brake cylinder at a different rate, and an emergency valve device operated upon a reduction in brake pipe pressure to effect the operation of said valve means and to establish communication between the emergency reservoir and the communication to which fluid under pressure is supplied from the auxiliary reservoir by operation of said triple valve device.

9. In a fluid pressure brake, the combination with a brake pipe, a brake cylinder, an auxiliary reservoir, an emergency reservoir and an inshot reservoir, of a triple valve device operative upon a reduction in brake pipe pressure to establish a communication through which fluid under pressure is supplied from said auxiliary reservoir to said brake cylinder, valve means subject to the opposing pressures of a chamber and said emergency reservoir for controlling said communication and operative to close said communication and establish another communication through which fluid under pressure is supplied from said inshot reservoir to said brake cylinder at a certain rate and from said auxiliary reservoir and emergency reservoir to said brake cylinder at a different rate, a quick action reservoir and an emergency valve device operative upon a reduction in brake pipe pressure to vent fluid under pressure from said quick action reservoir to said chamber to effect the operation of said valve means, and means controlled by brake cylinder pressure for varying the rate at which fluid under pressure is supplied from said auxiliary reservoir and emergency reservoir to said brake cylinder.

10. In a fluid pressure brake, the combination with a brake pipe, a brake cylinder, an auxiliary reservoir, an emergency reservoir and an inshot reservoir, of a triple valve device operative upon a reduction in brake pipe pressure to establish a communication through which fluid under pressure is supplied from said auxiliary reservoir to said brake cylinder, valve means subject to the opposing pressures of a chamber and said emergency reservoir for controlling said communication and operative to close said communication and establish another communication through which fluid under pressure is supplied from said inshot reservoir to said brake cylinder at a certain rate and from said auxiliary reservoir and emergency reservoir to said brake cylinder at a different rate, a quick action reservoir and an emergency valve device operative upon a reduction in brake pipe pressure to vent fluid under pressure from said quick action reservoir to said chamber to effect the operation of said valve means, said chamber having a restricted atmospheric port, said valve means being operative by emergency reservoir pressure upon a predetermined reduction in pressure in said chamber for varying the rate at which fluid under pressure is supplied from said auxiliary reservoir and emergency reservoir to said brake cylinder, said emergency valve device being also operative upon a reduction in brake pipe pressure to connect the emergency reservoir and first mentioned communication.

11. In a fluid pressure brake, the combination with a brake pipe and a brake cylinder, of valve means operated upon a reduction in brake pipe pressure for supplying fluid under pressure to said brake cylinder, a valve device having different positions for establishing different communications through which fluid under pressure supplied by said valve means is adapted to flow to said brake cylinder at different rates, said valve means being operative upon a reduction in brake pipe pressure to effect movement of said valve device to one of said positions, and means operated a predetermined period of time after movement of said valve device to said one position to move said valve device to another position.

12. In a fluid pressure brake, the combination with a brake pipe and a brake cylinder, of valve means operated upon a reduction in brake pipe pressure for supplying fluid under pressure to said brake cylinder, a valve device having different positions for establishing different communications through which fluid under pressure supplied by said valve means is adapted to flow to said brake cylinder, means operative in one of said positions to restrict the supply of fluid under pressure to said brake cylinder, said valve means being operative upon a reduction in brake pipe pressure to effect movement of said valve device to said one position, and means operative a predetermined period of time after movement of said valve device to said one position for effecting movement of said valve device to another position.

13. In a fluid pressure brake, the combination with a brake pipe and a brake cylinder, of valve means operated upon a reduction in brake pipe pressure for supplying fluid under pressure to said brake cylinder, a valve device for controlling the flow of fluid under pressure from said valve means to said brake cylinder and having one position for permitting flow of fluid under pressure to said brake cylinder at a certain rate, and having another position for permitting flow of fluid under pressure to said brake cylinder, means operative in the last mentioned position for providing different rates of flow of fluid under pressure to said brake cylinder, and pressure sensitive means set in operation upon initiating a reduction in brake pipe pressure for moving said valve device to its different positions.

14. In a fluid pressure brake, the combination with a brake pipe and a brake cylinder, of valve means responsive to a reduction in brake pipe pressure to supply fluid under pressure to said brake cylinder, a valve device for controlling the supply of fluid from said valve means to said brake cylinder, said valve device having a normal position and another position, means operative in the other position to provide different rates of flow of fluid under pressure to said brake cylinder, means operative upon the response of said valve means to a reduction in brake pipe pressure to move said valve device to said other position, and means operative a predetermined period of time after movement of said valve device to said other position to move said valve device to said normal position.

15. In a fluid pressure brake, the combination with a brake pipe and a brake cylinder, of valve means responsive to a reduction in brake pipe pressure to supply fluid under pressure to said brake cylinder, a valve device for controlling the supply of fluid from said valve means to said brake cylinder, said valve device having a normal position and another position for establishing different communications through which fluid is adapted to be supplied to said brake cylinder, means operative in the other position of said valve device for concurrently permitting flow of fluid from said valve means to the brake cylinder at a restricted rate and for supplying fluid under pressure to said brake cylinder from another source at a more rapid rate, means operative in the normal position of said valve device for supplying fluid to said brake cylinder at a rapid rate, means operative upon the response of said valve means to a reduction in brake pipe pressure for moving said valve device to the other position, and means operative a predetermined period of time after movement of said valve device to said other position for moving said valve device to said normal position.

ELLIS E. HEWITT.